May 4, 1943.  E. CALDWELL  2,318,372
COUNTER OPERATING MECHANISM AND CONTROL
Filed Dec. 18, 1939  2 Sheets-Sheet 1
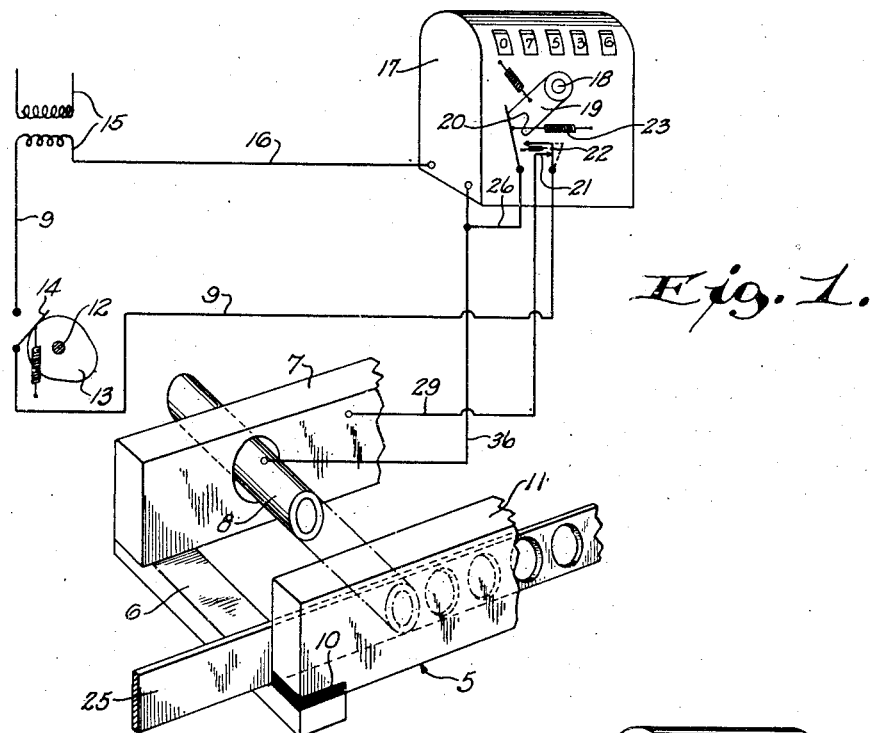
Fig. 1.
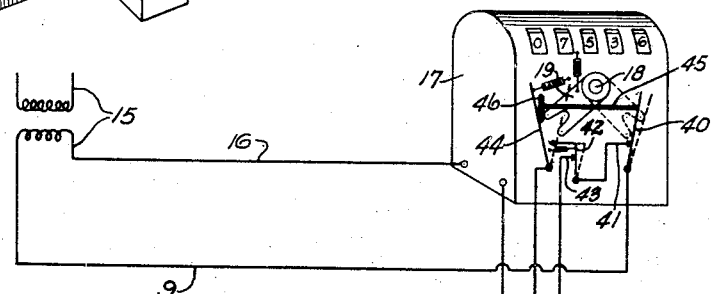
Fig. 2.
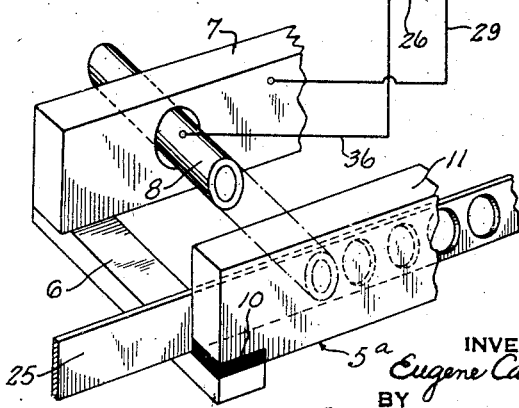
INVENTOR
Eugene Caldwell,
BY
Morsell, Lieber & Morsell
ATTORNEYS.

May 4, 1943.  E. CALDWELL  2,318,372
COUNTER OPERATING MECHANISM AND CONTROL
Filed Dec. 18, 1939  2 Sheets-Sheet 2

INVENTOR
Eugene Caldwell,
BY
Morsell, Lieber & Morsell
ATTORNEYS.

Patented May 4, 1943

2,318,372

UNITED STATES PATENT OFFICE 2,318,372

COUNTER OPERATING MECHANISM AND CONTROL

Eugene Caldwell, Whitefish Bay, Wis., assignor to Wrought Washer Mfg. Co., Milwaukee, Wis., a corporation of Wisconsin Application December 18, 1939, Serial No. 309,789

4 Claims. (Cl. 235—92)

This invention relates to improvements in counter operating mechanisms and controls.

In many industries machine operators are paid on a piece rate basis and therefore it is desirable to couple a standard counting mechanism with the machine in question for the purpose of counting or tabulating the successive pieces of work turned out or operated on by the machine. Where the work turned out is light and small and where the engagement of the work with the machine may be haphazard or variable, it has heretofore been impractical to adapt and connect a counting mechanism with certain types of machines, and obtain accurate and successful tabulation of the work. Problems also arise in regard to machine operation, even where piece rates are not in effect, because it may be desirable to accurately tabulate the machine production to determine when a specified order has been completed, or to determine the production efficiency of the equipment as it is being operated. Furthermore, in many adaptations of punch presses or similar machines, where the machine is operated with a clutch with the machine making but a single stroke for each unit of work produced, the production can be satisfactorily counted with a mechanical or electrical counter attached to the press mechanism itself. The present invention finds particular application, however, in relation to punch presses or like machines which operate continuously. In this connection a counter attached to the machine tool mechanism would merely count the revolutions of the machine and would not tabulate the units of work produced by the machine. The present invention is particularly adapted to that class of machines which operate continuously and in which it is necessary to count only the effective strokes of the machine tool when the material to be worked on is in proper position to be engaged by the machine tool.

An example of the problems encountered may be in connection with the operation of a punch or drill press wherein an advanced portion of a strip of stock is repeatedly contacted by the machine tool for producing small and light items. Ordinarily, it might be supposed that an electrical counter could be connected, through a simple electrical circuit, with a portion of the machine successively contacted by the stock upon each operation of the machine tool. This arrangement, however, is not practical because successful and accurate operation of the counter is dependent upon completion of a proper electrical circuit to the counter upon each engagement of the work with a selected part of the machine. For instance, if the material or stock engages the desired part of the machine for too short a period or in a manner so that a proper electrical connection is not maintained for a requisite period, then the counter will not be energized sufficiently to actuate the mechanism and establish a count, although in fact, a unit may have been produced from the stock. Again, the contact of the material with the machine part may be too long, during which period there may be several interruptions of the contact of the material with the machine part thereby causing several improper actuations and registrations of the counter while the machine is producing only one unit.

With the above in mind, it is, therefore, a primary object of the present invention to overcome the above objections by providing a machine associated counter operating mechanism and control wherein auxiliary means are provided for insuring but a single actuation of the counter upon each successive engagement of the stock with the selected portion of the machine, whether the engagement be short and impositive, or whether it be continued, subject to interruptions, beyond the supposed time period.

A further object of the invention is to provide in an electrically controlled machine associated counter, an auxiliary electrical circuit and switch therein which is controlled by any slight movement of the counter armature to establish a circuit to the counter for a sufficient period to cause full actuation of the counter, and only for such period.

A further object of the invention is to provide a controlling mechanism of the character described wherein the metallic part of the machine which is engaged or contacted for counter operation can only be energized the minimum length of time possible during the cycle of operation. This has the advantage of preventing accidental operation of the counter by contact, for example, of a wrench with the selected metallic portion of the machine while the machine tool is in its retracted or non-operating position.

Another object of the invention, particularly attributable to several of the first disclosed forms of the invention, is to eliminate sparking and consequent burning of the tool, material or equipment while the machine tool is operating and while a circuit to the counter is closed to obtain actuation of the counter. With this in mind several forms of the present invention contemplate an arrangement wherein no current will be flowing in the main circuit and through the machine at the time that the tool leaves the material which it is working on.

Further advantages of the invention, particularly attributable to several of the alternative forms of the invention herein disclosed are that a complete stroke of the counter armature is assured regardless of the weakness of the electrical contact through the frame of the machine, and a complete stroke of the armature, and registering of the counter is assured regardless of the shortness of the time of contact through the machine frame.

A further object of the invention is to provide a counter operating mechanism and control with which a machine may be readily equipped with a minimum of modification, which is inexpensive to manufacture and install, which is automatic and positive in operation, which is strong and durable, and which is well adapted for the purposes set forth.

With the above and other objects in view the invention consists of the improved counter operating mechanism and control and its parts and combinations as set forth in the claims, and all equivalents thereof.

In the accompanying drawings in which the same reference characters indicate the same parts in all of the views:

Fig. 1 is a diagrammatic and semi-schematic view of a preferred form of the invention showing an electrical counter, electrically connected through a main circuit with portions of a punch press, there being an auxiliary circuit which comes into operation, upon initial completion of the main circuit to complete proper single actuations of the counter mechanism and to further break the main circuit through the machine;

Fig. 2 is a similar diagrammatic and semi-schematic view of another form of the invention embodying the main features of the circuit arrangements disclosed in Fig. 1, but including different switch mechanisms operated by the counter for controlling the several circuits;

Figure 3:
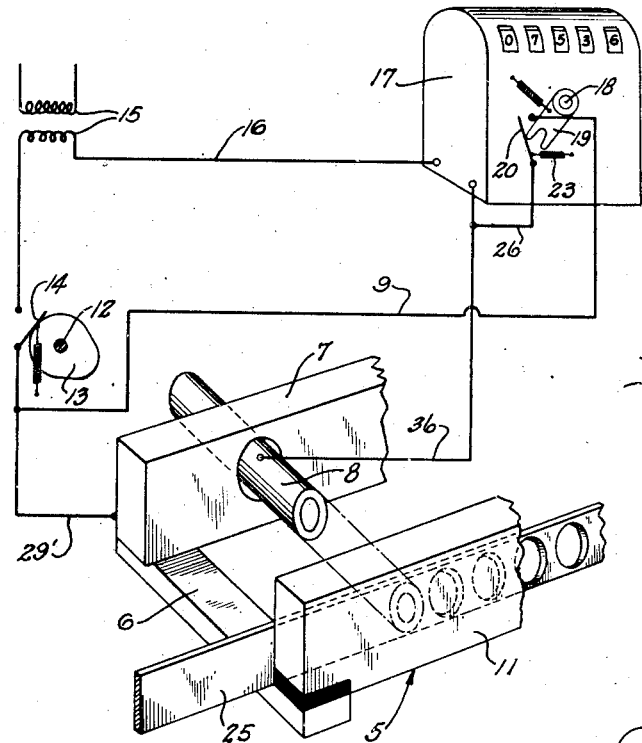
Fig. 3 is a similar view of another form of the invention wherein, when the counter is operated current may flow through both the main and auxiliary circuits.

Referring now more particularly to the drawings, with reference to the form of the invention shown in Fig. 1, it will appear that a portion of a punch press, or a similar machine, is shown in schematic form and is indicated generally by the numeral 5. Said machine may include a metallic gauge plate 6 and a metallic stripper plate 7 through which a punching or cutting tool 8 reciprocates. The gauge plate 6 is vertically adjustable to regulate the position of the work supported thereon relative to the tool and a portion of said gauge plate is connected with the stripper plate. A main circuit wire 29 connects with the stripper plate 7 and hence also provides an electrical connection for the gauge plate 6. The latter is separated by insulation 10 from another metallic frame portion 11 of the machine. The tool 8 is also electrically connected within the main circuit, and in the schematic view a circuit wire 36 is shown as being connected to the tool, although in actual practice said connection 36 may be with any metallic portion of the machine except the stripper plate 7 and the gauge plate 6. It should be noted that the tool 8 is spaced within an opening therefor in the stripper plate and is, therefore, not in electrical contact with the stripper plate. The members 6 and 7 are insulated relative to the remainder of the metallic portions of the press including the tool 8 and the frame portion 11.

The machine tool 8 is operated by a crank shaft 12 in the usual manner and several forms of the present invention contemplate mounting fast on the crank shaft a cam 13, which upon every revolution of the crank shaft to move the tool to operative position, will close a switch 14 in the main electrical circuit.

The switch 14 is in a main electrical connection 9 which extends to one side of a suitable transformer 15, which transformer is also connected with a source of current supply (not shown). The other side of the transformer is connected by a circuit wire 16 with one terminal of an electrical counter 17. Said counter is of conventional construction wherein an armature is energized to operate number wheels. The armature (not shown) oscillates a shaft 18 extending through the counter casing, and said shaft on its outer end, carries an arm 19, which in the form of the invention shown in Fig. 1 is utilized to actuate a sensitive snap-action switch 20. The switch 20 is in and controls both the main circuit and an auxiliary circuit which will hereafter be described in detail. The switch is of the type which insures the establishment of one circuit before the other circuit is broken and in any position of the switch one or the other of the circuits in which it is included must be closed.

In the schematic showing of Fig. 1 the circuit wire 29 from the stripper plate of the machine extends to a fixed contact element 21 in said switch. Said contact element 21 is, when the armature of the counter is at rest, normally engaged by a movable snap-action switch element 22 which is included in the other end of the earlier mentioned electrical connection 9. The terminal of the element 22 is, when the counter is at rest, separated from the switch 20 but when the counter functions, a spring 23 will cause the switch 20 to first contact the element 22 establishing a circuit through certain auxiliary connections and upon further movement of the switch 20 it will flex the contact element 22 away from the contact element 21, as indicated in dotted lines in Fig. 1, and break the connection as between the elements 21 and 22.

The main electrical circuit, in addition to the connections heretofore referred to, includes the circuit wire 36 returning from the machine tool or other portions of the machine frame, and this circuit wire is attached to the other terminal of the counter 17. The main circuit is closed and current flows to the counter 17 only when the crank shaft 12 has turned to project the tool 8 and to cause the cam 13 to close the cam switch 14, and then only if a piece of metallic work stock 25 is properly positioned on the gauge plate 6 of the machine originally slightly spaced from the member 11 and is furthermore electrically connected with the other side of the main circuit by being engaged by the tool 8. Under these conditions the current will initially flow through the main circuit as follows: From the source the current flows through the transformer 15 and through the connections 9, which are closed by the switch 14. The current then flows from the far end portion of the connection 9 through the switch element 21 and through the connection 20 to the stripper plate of the machine. The work is in electrical connection with the stripper plate by being mounted on the gauge plate 6, and when the electrically connected tool 8 engages the work, the current then flows through the connection 36, through the counter mechanism 17 and back through the main circuit connection 16.

The auxiliary circuit of the system includes only a connection 26 tapped off of the main line connection 36 from the counter terminal. The connection 26 extends to the counter switch 20 and the movable switch element 22 also forms a part of the auxiliary circuit. In other respects the auxiliary circuit includes certain connections also forming part of the main circuit, but does not include the machine 5, and when the auxiliary circuit is functioning the main circuit is broken. The current in the auxiliary circuit, when the main switch 14 is closed, flows from the source through the transformer 15 and through the connections 9 to the switch element 22. At this time the switch element 22 is disengaged from the switch element 21, but is engaged with the switch element 20, and hence the current flows from the element 22 through the switch 20 and the connection 26 to and through the counter and returns through the main connection 16, which also serves both the main and auxiliary circuits. This auxiliary circuit is of the utmost importance in the present invention and insures successful operation of the counter under all conditions, as will hereafter appear, and eliminates objections mentioned heretofore.

The machine 5 with which the electrical counter is adapted to be associated by means of the improved actuating and controlling mechanism is, by way of example, a punch or drill press. When the press is operating, the tool 8 is continually reciprocated so as to successively engage advanced portions of the stock 25 to stamp desired elements out of the same, the stock being disposed on the gauge plate 6 of the machine and being successively advanced for each reciprocation of the machine tool. During that portion of the cycle of the operation of the machine when the tool is retracted, the cam 13 on the machine crank shaft 12 will be in the position shown, and the main switch 14 will be open, so there will be no current flow to the counter. When the crank shaft 12 turns to a position to project the tool toward the work, the cam will be moved to a position so as to close the main switch 14. With the work or stock 25 engaging the gauge plate 6 of the machine which is electrically connected to one side of the circuit, and when the tool 8 contacts the stock, the tool being connected to the other side of the main circuit, the circuit will be completed through the machine to the counter.

The initial impulse given to the counter armature will cause the counter arm 19 to flutter or swing in a counterclockwise direction relative to Fig. 1. The switch element 20, by virtue of the spring 23, will then immediately contact the switch element 22 and close the auxiliary circuit and immediately thereafter, upon further movement of the switch element 20, the switch element 22 will be moved away from the switch element 21, breaking the main circuit. When this situation is established, there is current flow through the counter by means of the auxiliary circuit, but no current flows through the machine or tool. This auxiliary circuit will be closed until the crank shaft 12 of the machine turns to retract the tool and to open the switch 14. Hence, a single proper actuation of the counter mechanism is assured for each reciprocation of the tool into engagement with the work. The initial impulse given to the counter armature by the closing of the main circuit insures the establishment of the auxiliary circuit and the proper functioning of the counter, and this takes place even if the engagement of the stock with the gauge plate is haphazard or for too short a period. On the other hand, if the material bridges the main circuit for too long a period or if an operator accidentally places a tool on the machine and thereby unauthorizedly bridges the main circuit, there will be no continued operation of the counter, because the auxiliary circuit provides for but a single actuation of the counter, and upon movement of the machine crank shaft the circuits will be opened through the switch 14. Upon return of the spring actuated armature arm 19 to the normal position shown, as is usual with this type of counter, the switch element 20 is engaged thereby and separated from the switch element 22, whereby the auxiliary circuit is broken. This sequence of operations continues with every revolution of the crank shaft of the machine.

In Fig. 2 of the drawings a modified form of the invention is disclosed utilizing substantially the same circuit arrangements found in connection with the showing of Fig. 1. However, this arrangement is particularly adapted for a machine 5a, which does not have associated therewith some operating element to actuate a cam and a main switch in proper timed relationship. Therefore, with reference to Fig. 2 it will be observed that the main circuit to the counter 17 does not include a machine operated switch. The main circuit in this arrangement includes a circuit wire 36 connected to the machine tool 8 or to some other part of the frame of the machine which is insulated relative to the gauge plate 6 and the stripper plate 7. The connection 36 terminates at one of the terminals of the counter 17. The other terminal of the counter 17 carries a circuit wire 16 which connects to one terminal of the transformer 15. The other terminal of the transformer 15 has extended therefrom a circuit wire 9 which ultimately connects with a single throw switch 40 mounted adjacent the armature operated arm 19 of the counter and actuated thereby. The single throw switch element 40 is adapted to make and break connections with a complementary switch element 41 and the switch element 41 connects with a swingable, snap-action switch element 42 forming part of a double throw switch and adapted to make and break connections with a fixed switch terminal 43 from which extends a circuit wire 29 which connects with the stripper plate 7 of the machine.

In said modified form of the invention, therefore, the current in the main circuit flows from the source through the transformer 15, through the circuit wire 9 and the closed switch elements 40 and 41, through the contacting switch elements 42 and 43, through the connection 29 to the stripper plate, and when the metallic work 25 is positioned on the gauge plate 6 and contacted by the tool 8, the main circuit is completed through the connection 36 to the counter and through the counter and back to the other side of the circuit through the connection 16.

The auxiliary circuit includes a connection 26 tapped off of the main connection 36 extending from the counter and connecting with the counter operated snap-action switch element 44 which is spring urged. The switch element 40 is not spring urged in either direction and can remain in either its open or closed position, depending upon its associated mechanism. There is, however, an insulated mechanical link 45 connected at one end to the switch 40 and having its other end formed with a flange 46 within the path of travel of one side of the armature arm 19 and adjacent switch 44.

Whenever there is metallic work on the gauge plate 6 of the machine and the tool is projected to engage the work for forming a unit, the main circuit will be closed through the connections previously mentioned. This will energize the armature of the counter, and even though the establishment of the main circuit is short or relatively weak, it will nevertheless cause sufficient movement of the armature to disengage the arm 19 from the flange 46 of the metallic link, thereby permitting the switch 44 to close against the movable switch element 42. This will establish a circuit through the auxiliary circuit ahead of the breaking of the main circuit and further movement of the switch 44 toward the right in Fig. 2 will move the switch element 42 toward the dotted line position and separate it from the switch element 43 of the main circuit. Energization of the armature of the counter will, therefore, be continued through the auxiliary circuit so as to register one count, and the arm 19 will make a full stroke to the right (relative to the drawing) and will thus engage the switch 40 and move it to its open position. This will break the auxiliary circuit to the counter, and as the main circuit was previously broken, the armature will be de-energized and the spring mechanism connected to the arm 19 will cause it to return to its normal position as shown. During the main portion of the travel of the arm 19 back to its normal position, the switch 40 will remain open. At about the time the arm 19 reaches its original position it will contact the flange 46 on the link 45 and move it in a direction to cause closing of the switch elements 42 and 43 relative to one another, and closing of the switch elements 40 and 41, and disengagement of the switch 44 from the element 42. The auxiliary circuit at this time will therefore be broken and the main circuit will be likewise broken because this occurs at a time when the tool is retracted from the work. Successive operations of the machine 5a, with material properly positioned thereon and successively engaged by the tool, causes successive operations of the counter in the same manner. A complete stroke of the counter armature is assured regardless of how weak the original electrical contact through the frame of the machine may have been. Also, a positive operation of the counter for one count is assured regardless of how short duration the contact through the frame of the machine may have been.

In the forms of the invention disclosed in Figs. 1 and 2 the main circuit through the machine, the tool and the work is always broken before the counter completes its actuation. This therefore prevents any sparking as between the tool and the work such as might annoy the operator and furthermore prevents burning of the tools, material or equipment. This is highly advantageous, because the life of the tools is greatly prolonged.

The form of the invention disclosed in Fig. 3 differs from that shown in Fig. 1 in that a simple single switch of a quick acting type is employed adjacent the counter to be actuated by the counter arm 19. Also in this form of the invention, when the auxiliary circuit is closed, the main circuit is not necessarily broken and current may flow through the machine, the tool and the work. The particular arrangement is, however, adapted for use in connection with a machine wherein a cam may be employed on the machine crank shaft to control the main switch 14.

As was the case in connection with the form of the invention of Fig. 1, when the crank shaft 12 turns to reciprocate the tool toward the work stock 25, the cam 13 will close the main switch 14. Current will then flow from the source through the transformer and through the main circuit wire 29' to the stripper plate 7 through the work 25 to the engaging tool 8 and through the connection 36 to the terminal of the counter 17 and through the counter and back through the connection 16. The current flow through counter will energize the counter armature to cause actuation thereof.

If the stock is not properly engaged with the gauge plate 6 of the machine and the main circuit is thereby established for too short a period or is possibly rather weak, the armature of the counter will nevertheless be momentarily energized so as to cause the arm 19 to move away from the counter switch 20. The switch will then close and establish an auxiliary circuit to the counter, such auxiliary circuit being through the connection 9, the closed switch 20, the auxiliary connection 26 and then through the counter and the connection 16. The closing of the auxiliary circuit insures an operation of the counter for a single count, even though the circuit established through the main source is not of proper duration. If, during the cycle of operation of the machine, electrical contact is made through the machine frame accidentally more than once, there will only be one actuation of the counter inasmuch as the armature and the arm 19 will be held in their extreme positions to the right, closing the auxiliary circuit, but as soon as the cam 13 permits opening of the main switch 14, additional contacts with the metallic portions of the machine 5 will have no effect on the auxiliary circuit. As long as the cam operated switch 14 is open, there can be no count made through the counter 17, and this provides for such contingencies as unauthorized engagements of the pieces of material with parts of the machine frame.

Figure 4:
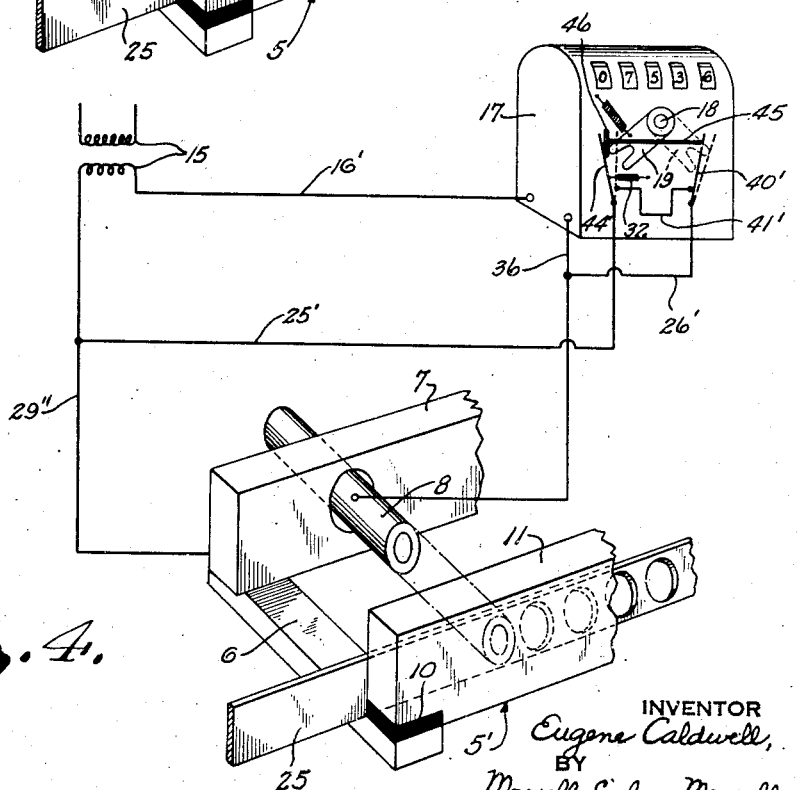
Fig. 4 is a similar view of still another modified form of the invention utilizing the circuit arrangements of Fig. 3 with different counter actuated switch mechanisms for controlling the several circuits.

Still another modified form of the invention is disclosed in Fig. 4 with this arrangement being applicable to a machine 5' which does not have associated therewith some operating element to actuate a cam and a main switch in proper timed relationship. This arrangement may be used with the same type of machine as the arrangement of Fig. 2, but no provision is made for breaking the circuit through the machine when the auxiliary circuit is established.

When the machine 5' is operating with the work 25 positioned on the gauge plate 6, the projection of the tool 8 into the work closes the main circuit which is established from the source through the transformer 15 and through the connection 29'' to the stripper plate 7. The current then flows through the gauge plate 6, the work 25 to the tool 8 and through the connection 36 to one terminal of the counter 17. The current flows through the counter electrical mechanism and returns via the connection 16'. The energization of the armature of the counter, even though slight and for a short period, is sufficient to cause disengagement of the armature arm 19 from the insulated flange 46 of the insulated link 45 whereby the switch 44' will close. Immediately, the auxiliary circuit is established through the switch element 41' and the auxiliary circuit connection 26' to one terminal of the counter through the counter and the connection 16'. It should be observed that the movable element of the switch 44' has an auxiliary circuit connection 25' with the circuit wire 29'.

With the establishment of this auxiliary, solid metallic circuit to the counter, energization of the armature will be continued so as to register one count, and the arm 19 will make a full stroke to the right (relative to the drawing) and will thereby engage another switch element 40' and move it to its open position. This will break the solid metallic or auxiliary circuit to the counter, de-energizing the armature and permitting it and the arm 19 to be returned through the spring mechanism therein, to their original positions. During the main portion of the travel of the arm 19, back to its normal position, switch 40' will remain open. At about the time the arm 19 reaches its original position it will engage the insulated flange 46 on the insulated link 45 and move it in a direction to cause the closing of the switch 40'. At about this time the flange 46 also engages and opens the switch 44' and the circuit will be thereby broken and there will be no further operation of the counter. Successive operations of the machine 5', with material in position thereon and successively engaged by the tool 8, will cause successive operations of the counter in the same manner. In this form of the invention, as in the form shown in Fig. 2, a complete stroke of the counter armature is assured regardless of how weak the initial electrical contact through the frame of the machine 5' may be. A positive operation of the counter for one count is absolutely obtained.

While the forms of the invention disclosed in Figs. 1 and 2 provide for an opening of the main circuit through the machine and tool after the counter armature commences to move, thereby prohibiting the flow of current through the machine with its attendant disadvantages, the forms of the invention disclosed in Figs. 3 and 4 do not directly provide against this contingency, because after the auxiliary circuits are closed, the main circuits are nevertheless also closed and the current may divide and flow through both circuits. In actual practice there is not sufficient current flowing through the machine frame and the tool to cause serious objections, and sparking can be reduced to a negligible quantity by connecting a condenser in the main circuit as, for instance, between the connections 29' or 29'' and the tool 8.

In actual practice in all forms of the invention the stripper plate 7 of the machine as well as the gauge plate 6 are connected to one side of the main electrical circuit and a contact can be assured by having the metallic work engage either the member 6 or the stripper plate 7. For instance, when the material 25 is resting on the gauge plate it is directly connected to that side of the circuit which includes the connections 29, 29' or 29''. The entire frame of the machine, including the tool 8, is electrically connected with the other side of said circuit. As the tool 8 strikes the material 25 the main electrical circuit is completed. If there has not been a contact between the material 25 and the gauge plate 6 of the machine, such as might happen at the beginning of a new piece of material before it actually engages the gauge plate, then the contact of the material against the stripper plate is relied upon to complete the circuit. In the punching action of the machine 5 or 5' the material is pushed tightly over the punch or tool 8 and force is required to remove it therefrom. The material is removed or stripped from the tool by engagement with the stripper plate 7 when the punch recedes or retracts into the stripper plate. This action occurs with each stroke of the press and hence, if the material 25 does not make contact with the gauge plate 6, it will nevertheless make contact with the stripper plate and insure a closing of the circuit in question.

From the foregoing description it will be apparent that all of the illustrated forms of the improved counter operating mechanism and control are especially adapted to certain types of machines wherein it has heretofore been difficult to obtain accurate counts of the element or work turned out by the machines. The mechanism is furthermore of a simple and novel character and can be applied to a machine with a minimum of modification and at a relatively small expense. The particular form of punch press or machine herein illustrated and described is merely by way of example and the invention is not to be limited or restricted thereby.

What is claimed as the invention is:

1. In combination, a source of electrical current, a main electrical circuit connected to said source, an auxiliary electrical circuit connected to said source, an electrically operated counter included in both circuits, a machine having a movable metallic tool the functions of which are to be counted, the machine also having a metallic work support, the work support and tool being electrically insulated from each other but forming parts of the main circuit, said work support being adapted to support metallic work and said tool being movable into and out of contact with said supported work, said main circuit being normally open but being automatically temporarily closed during certain portions of the cycle of operation of the machine when the tool contacts any part of the supported work, a temporary closing of the main circuit being effective to initially energize the counter, counter actuated means operative after the initial energization of said counter for closing said auxiliary circuit to establish proper electrical connection of the counter with the source of current through said auxiliary circuit, and means for thereafter opening the auxiliary circuit.

2. In combination, a source of electrical current, a main electrical circuit connected to said source, an auxiliary electrical circuit connected to said source, an electrically operated counter included in both circuits, a machine having a movable metallic tool the functions of which are to be countered, the machine also having a metallic work support, the work support and tool being electrically insulated from each other but forming parts of the main circuit, said work support being adapted to support metallic work and said tool being movable into and out of contact with said supported work, said main circuit being normally open but being automatically temporarily closed during certain portions of the cycle of operation of the machine when the tool contacts any part of the supported work, a temporary closing of the main circuit being effective to initially energize the counter and close said auxiliary circuit and immediately thereafter open the main circuit with the counter having proper electrical connection with the source of current only through said auxiliary circuit, said means including an arm associated with the counter adapted to make a complete oscillation during each single operation of the counter, a spring urged switch operated by the counter arm when the latter starts an oscillation, said switch being effective to close the auxiliary circuit and immediately thereafter open the main circuit, and means for thereafter opening the auxiliary circuit.

3. In combination, a source of electrical current, a main electrical circuit connected to said source, an auxiliary electrical circuit connected to said source, an electrically operated counter included in both circuits, a machine having a movable metallic tool the functions of which are to be counted, the machine also having a metallic work support, the work support and tool being electrically insulated from each other but forming parts of the main circuit, said work support being adapted to support metallic work and said tool being movable into and out of contact with said supported work, said main circuit being normally open but being automatically temporarily closed during certain portions of the cycle of operation of the machine when the tool contacts any part of the supported work, a temporary closing of the main circuit being effective to initially energize the counter, counter actuated means operative after the initial energization of said counter for closing said auxiliary circuit to establish proper electrical connection of the counter with the source of current through said auxiliary circuit, and switch means operative after a single operation of the counter for disconnecting said counter from the source of current, said latter means being independent of the machine and the work therein.

4. In combination, a source of electrical current, a main electrical circuit connected to said source, an auxiliary electrical circuit connected to said source, an electrically operated counter included in both circuits, a machine having a movable metallic tool the functions of which are to be counted, the machine also having a metallic work support, the work support and tool being electrically insulated from each other but forming parts of the main circuit, said work support being adapted to support metallic work and said tool being movable into and out of contact with said supported work, said main circuit being normally open but being closed during certain portions of the cycle of the operation of the machine when the tool moves into engagement with any part of said work, the closing of the main circuit being effective to cause initial energization and preliminary actuation of the counter through the main circuit, a cycle of operation of the machine including contact of the tool with the work and removal of the tool from the work, switch means operative after initial energization of the counter for closing said auxiliary circuit and breaking the main circuit whereby energization of the counter is continued through the auxiliary circuit, said break in the main circuit occurring prior to the removal of the tool from the work and preventing sparking as between the tool and work and subsequent tool pitting, and means for thereafter opening the auxiliary circuit.

EUGENE CALDWELL.